United States Patent [19]

Lobo et al.

[11] Patent Number: 4,538,852
[45] Date of Patent: Sep. 3, 1985

[54] DRAFT DEFLECTORS FOR MOTOR CARS

[75] Inventors: Claude Lobo, Cologne; Peter Burger, Pulheim-Geyen, both of Fed. Rep. of Germany

[73] Assignee: Ford Motor Company, Dearborn, Mich.

[21] Appl. No.: 529,173

[22] Filed: Sep. 2, 1983

[30] Foreign Application Priority Data

Sep. 23, 1982 [DE] Fed. Rep. of Germany ....... 3235148

[51] Int. Cl.³ .......................... B60J 7/22; B62D 35/00
[52] U.S. Cl. ........................................ 296/91; 296/217
[58] Field of Search .......................... 296/1 S, 91, 217; 280/756

[56] References Cited

U.S. PATENT DOCUMENTS 1,275,400  8/1918  Crowell ............................ 296/91 X
3,246,923  4/1966  Turner ............................. 296/91 X

FOREIGN PATENT DOCUMENTS 578111   5/1933  Fed. Rep. of Germany ...... 296/217
1022481  1/1958  Fed. Rep. of Germany ...... 296/217
1555341  1/1970  Fed. Rep. of Germany ........ 296/91
3042538  10/1981 Fed. Rep. of Germany .
615738   1/1927  France ................................... 296/91
304583   1/1955  Switzerland ......................... 296/217

Primary Examiner—Robert B. Reeves
Assistant Examiner—Russell D. Stormer
Attorney, Agent, or Firm—Clifford L. Sadler; Daniel M. Stock

[57] ABSTRACT

In draft deflectors for motor cars with a folding roof which include transversely extending members, such as a roof cross-member. The draft deflectors are formed on safety padding elements, such as frame padding or headrests associated with the interior of the vehicle, or as parts of the padding which, mounted so as to be pivotal about transverse axes of the vehicle, may be opened out from a rest position into an operating position.

4 Claims, 4 Drawing Figures

DRAFT DEFLECTORS FOR MOTOR CARS

BACKGROUND OF THE INVENTION

The invention relates to draft deflectors for motor cars with a folding roof and a roof cross-member.

A draft deflector for motor cars of this type is known from the German Offenlegungsschrift (Laid-Open Specification) No. 30 12 538. In the disclosed design, however, the draft deflector, associated with a component required by the vehicle design, such as a roof cross-member, is constructed as part of the roof covering and is mounted so as to be pivotable about a transverse axis of the vehicle.

The known draft deflector thus has the disadvantage that it can only be applied effectively in conjunction with relatively wide roof cross-members.

When traveling in a motor car with a folding roof, the passengers are subjected to the flow of the surrounding air to a greater or lesser extent when the roof is folded down. This air flow is felt as a draft. In the case of a two-seater vehicle, the passengers are accommodated relatively protected by the windshield, raised side windows and possibly, contrary to their purpose, raised sun visors. The draft effects are subjectively tolerable. If, however, there are passengers on the rear seats of a four-seater convertible, the air flow felt as a draft at a traveling speed over 50 km/h is felt as being very unpleasant.

SUMMARY OF THE INVENTION

These undesired draft effects are to be reduced considerably, according to one object of the invention, without the aerodynamic characteristics of the motor car being adversely affected.

This object is attained according to the invention in that a draft deflector for motor cars is provided which is formed with padding elements or headrests of the motor car.

It is a further object of the present invention to provide a deflector responsive to the deficiencies of the prior art that is economical to manufacture.

By virtue of the fact that draft deflectors are formed on safety padding elements, such as frame padding or headrests, associated with the interior of the vehicle, they may be formed relatively simply as parts of these padding elements consisting of foam material and may be moved so as to pivot about a transverse axis of the vehicle from a rest position into its operating position.

In this way, particularly in the case of a four-seater convertible with a roll bar, the comfort of the passengers in the rear seat may be substantially increased either by the outer profile of the roll bar disposed beneath the roof when the latter is closed being formed as a draft deflector, or by part of the inner frame padding of the roll bar being formed in such a way that it is mounted so as to be pivotable about a transverse axis of the vehicle and may be moved from a swung-in rest position into a swung-out operating position.

In this way the break-off line of the air flow is shifted above and beyond the rear edge of the roll bar, as a result of which the air sweeps over the heads of the passengers sitting on the rear seats and reduces the subjective draft by approximately 20%.

In this connection measurements have shown that the air resistance of the vehicle is slightly improved by a draft deflector of this type constructed on the roll bar.

The air flow acting upon the passengers on the rear seats of a four-seater convertible consists, however, not only of the air flow resulting directly from the headwind but also from a return flow of the air as a result of the break-off eddies on the tail of the vehicle.

According to the invention, even these unpleasant draft effects may be reduced by a draft deflector which is formed on rear headrests or is arranged pivotably as a part of the latter and may be moved from a rest position into an opened-out operating position.

In addition, such a return flow may also be prevented from reaching the passengers on the rear seats by a transparent wall which may be raised behind the headrests.

BRIEF DESCRIPTION OF THE DRAWINGS

The invention is explained in greater detail with reference to one exemplary embodiment illustrated in the accompanying drawings, in which.

DESCRIPTION OF THE PREFERRED EMBODIMENTS

Figure 1:
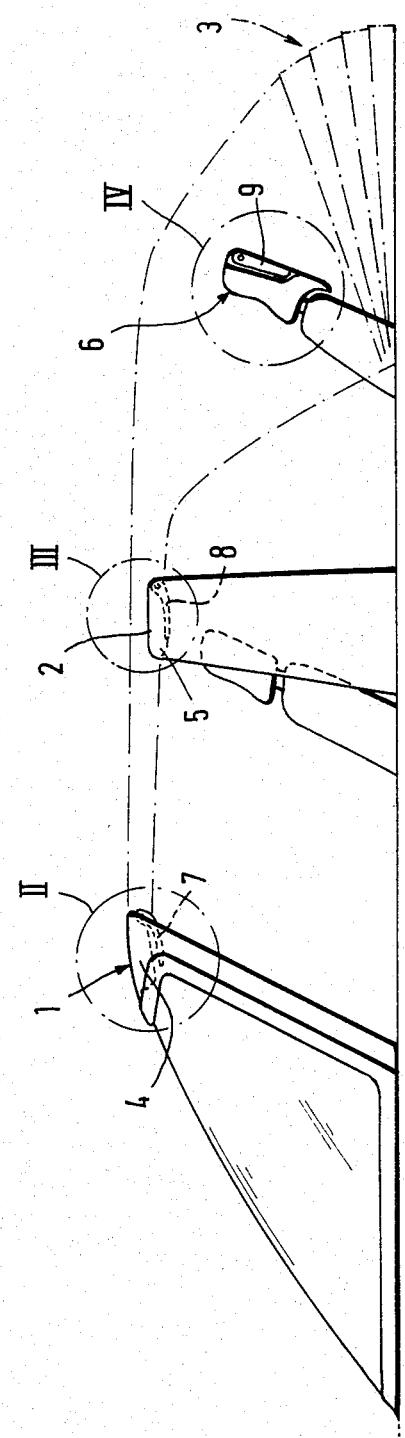
FIG. 1 is a diagrammatic side view of the passenger compartment of a four-seater convertible.

The upper area of the passenger compartment of a four-seater convertible is shown in FIG. 1.

A front roof cross-member 1 connecting a pillars supporting the windshield and a central roof cross-member 2 in the form of a roll bar are substantially completely covered when the folding roof 3 is closed.

In order to form integrated draft deflectors, it is therefore possible to use safety padding elements associated with the interior of the vehicle, such as the frame padding 4 of the front roof cross-member 1, the frame padding 5 of the central roof cross-member 2, and the padding of the rear headrests 6.

In this connection, one possible embodiment of the invention is indicated in FIG. 1, in which only the external contours of the safety padding elements have been designed to carry out the draft deflecting functions.

Figure 2:
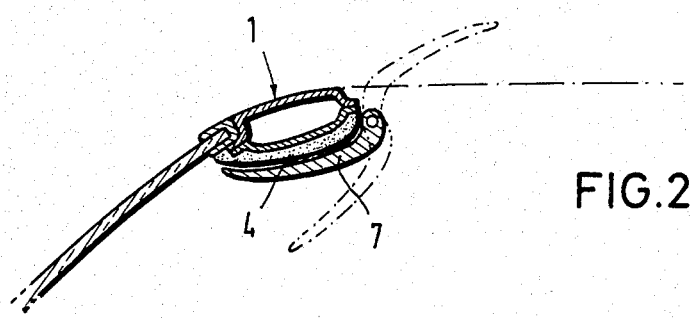
FIG. 2 is an enlarged view of a draft deflector arrangement as provided in the area of the roof cross-member in circle II in FIG. 1.
Figure 3:
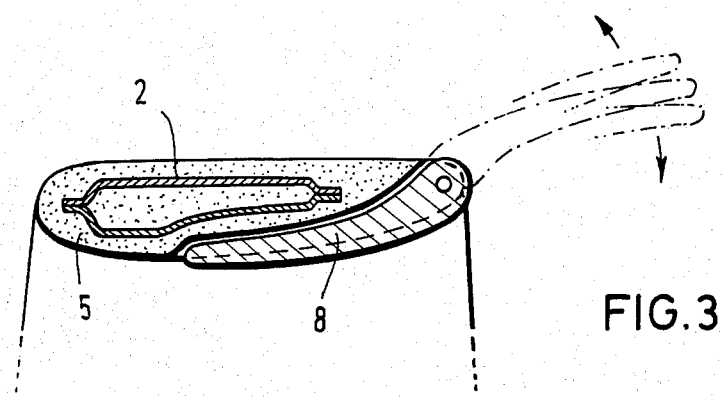
FIG. 3 is an enlarged view of a draft deflector arrangement in the area of the roll bar as provided in circle III in FIG. 1.
Figure 4:
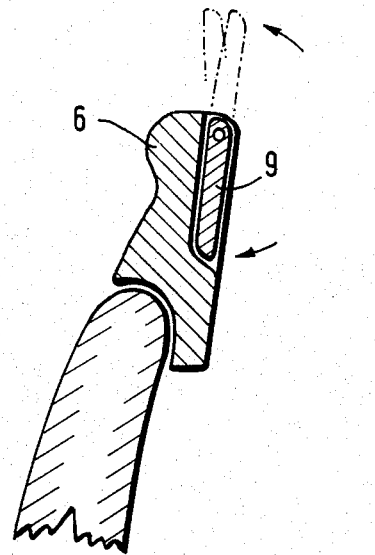
FIG. 4 is a draft deflector arrangement as provided in the area of the rear headrest in circle IV in FIG. 1.

FIGS. 2 and 3 show other solutions, in which the external contours of the safety padding elements are made essentially meeting the requirements of the folding roof covering them, and the draft deflectors are formed as parts 7 and 8, respectively, of the safety padding elements, such as the frame padding 4 of the front roof cross-section 1 or the frame padding 5 of the central roof cross-section 2. The parts 7 and 8 are mounted pivotally about a transverse axis of the vehicle and may be opened out from a rest position shown in solid lines into operating positions shown in broken lines. Similarly, a pivotally mounted part 9 may be mounted on the rear headrest 6.

Additional possibilities of arranging draft deflectors in the region of the headrests 6 of the rear seats are that a transparent wall is arranged so as to be raised parallel to the rear wall of the headrests 6 or, on the other hand, that both headrests are formed with a downwardly extending wall which connects them and which, when the headrests are raised, keeps the gap between the back of the seat and the headrest closed.

We claim:

1. Draft deflector means for motor cars of the type having a folding roof, a padded front roof cross member, a padded, longitudinally intermediate roll bar, and rear seat headrests, the draft deflector means characterized in that a first draft deflector is formed as part of the front roof cross member padding, a second draft deflector is formed as part of the roll bar padding, and further draft deflectors are formed on the rear side of each rear headrest, and that each of the draft deflectors are mounted for pivotal movement about axes transverse to the motor car.

2. Draft deflector means according to claim 1, characterized in that they are formed as parts which are carried substantially flush within the external contour of their respective padding elements and may be pushed out therefrom.

3. Draft deflector means for motor cars of the type having a folding roof, a padded front roof cross member, a padded, longitudinally intermediate roll bar, and rear seat headrests, the draft deflector means characterized in that a first draft deflector is formed as part of the front roof cross member padding, a second draft deflector is formed as part of the roll bar padding, and that each of the draft deflectors are mounted for pivotal movement about axes transverse to the motor car.

4. Draft deflector means according to claim 3, characterized in that the draft deflectors are formed as parts which are carried substantially flush within the external contour of their respective padding elements and may be pushed out therefrom.

* * * * *